A. M. LAYCOCK.
UNIVERSAL JOINT.
APPLICATION FILED DEC. 11, 1919.
1,373,082.
Patented Mar. 29, 1921.
2 SHEETS—SHEET 1.
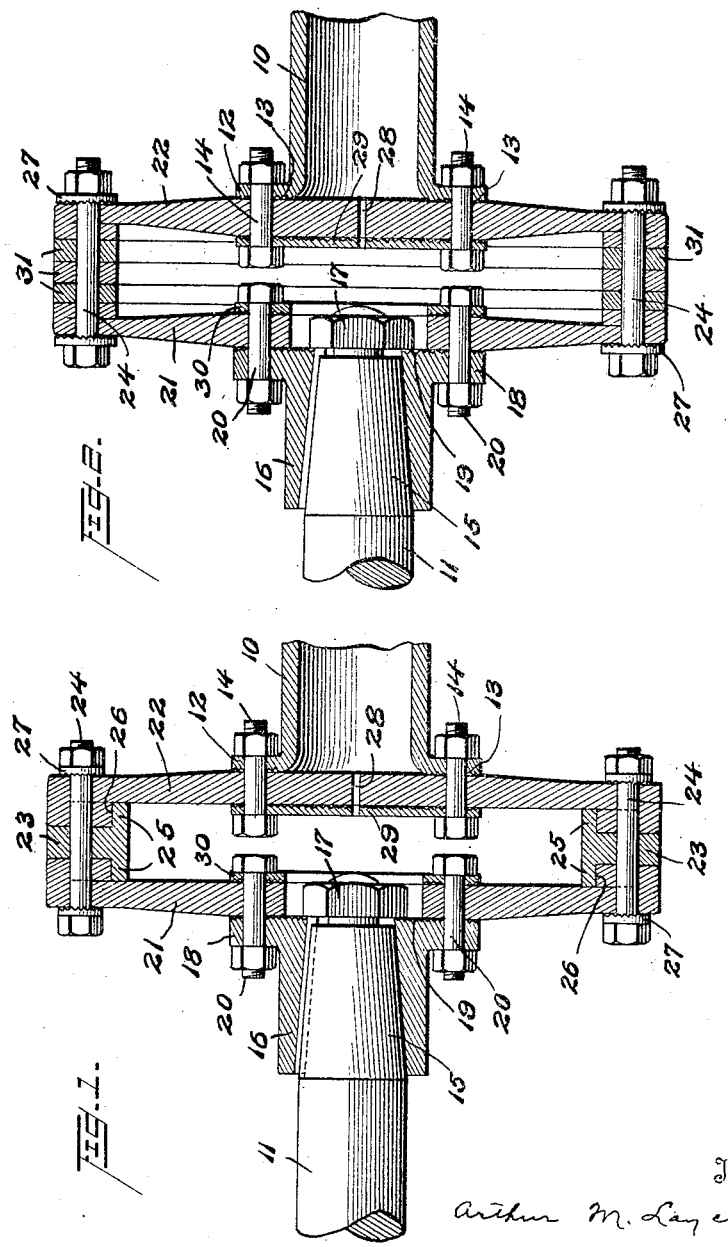

A. M. LAYCOCK.
UNIVERSAL JOINT.
APPLICATION FILED DEC. 11, 1919.
1,373,082.
Patented Mar. 29, 1921.
2 SHEETS—SHEET 2.
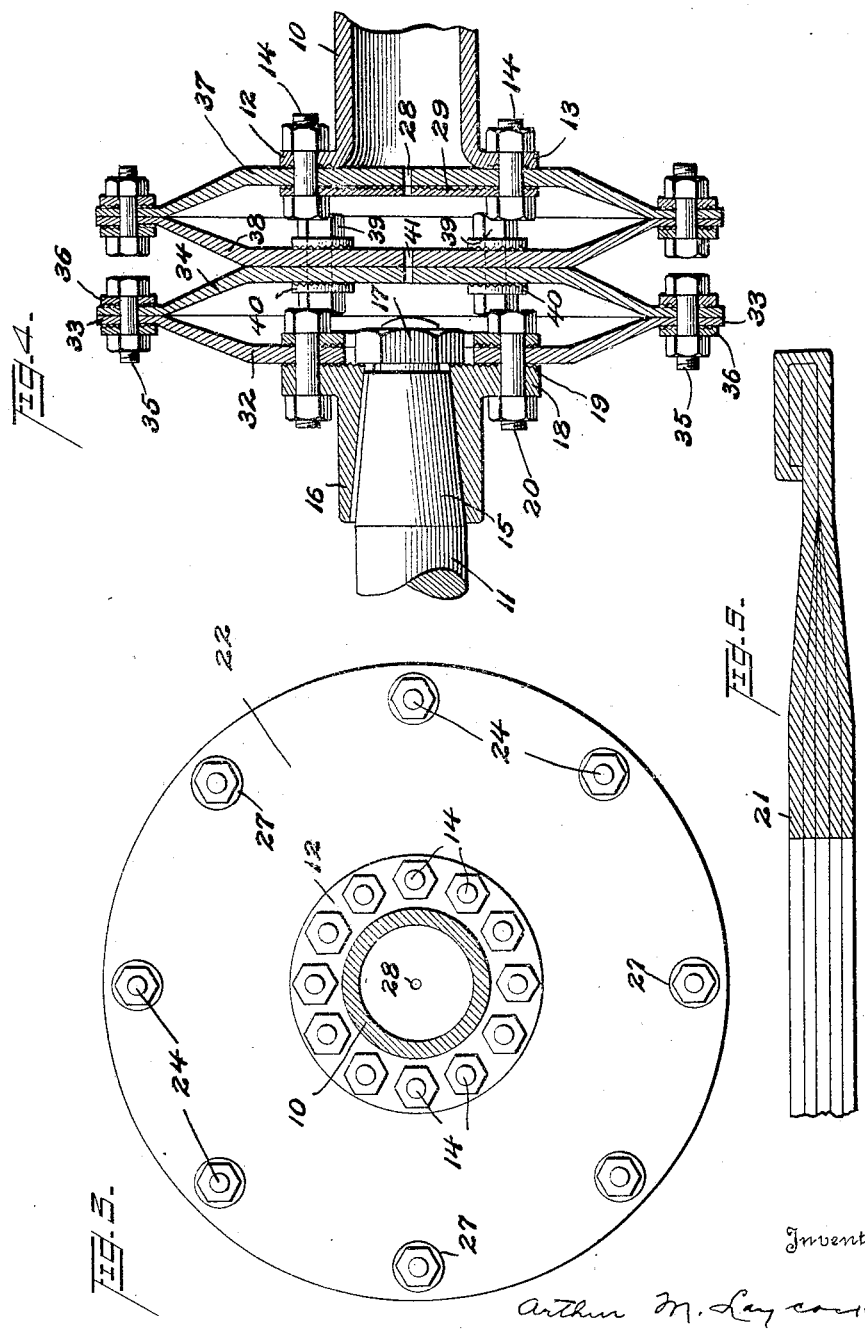

UNITED STATES PATENT OFFICE.

ARTHUR M. LAYCOCK, OF FORTYFORT, PENNSYLVANIA.

UNIVERSAL JOINT.

1,373,082. Specification of Letters Patent. Patented Mar. 29, 1921.

Application filed December 11, 1919. Serial No. 343,997.

*To all whom it may concern:*

Be it known that I, ARTHUR M. LAYCOCK, a citizen of the United States, and residing at Fortyfort, county of Luzerne, State of Pennsylvania, have invented certain new and useful Improvements in Universal Joints, of which the following is a specification.

This invention relates to universal joints and is particularly adapted for use in drive shafts, although it is not limited to that use. It embodies a construction in which there are no moving surfaces in contact to cause friction and wear, and to require lubrication. It furthermore not only permits the requisite movement out of line by the connected parts of the shaft as is necessary in universal joints, but also permits a certain amount of relative longitudinal movement between the connected parts of the shaft. In taking up longitudinal strains, however, there is a dash pot for cushioning and deadening the effect of sudden longitudinal movements or blows, and resulting in quieter running of the mechanism. This makes it particularly useful on the drive shafts of motor vehicles where there are occasional longitudinal strains as well as lateral strains, and where it is desired to avoid grinding or noise in operation. It embodies a construction in which the bending strains and the power transmitting strains are thoroughly and properly distributed to all parts of the device whereby each part or portion takes care of its part of the strain, and there is no undue localization of strain at any time, or on any part causing deterioration. It furthermore is so designed and arranged as to reduce to a minimum, any tendency to side whipping between the connected ends of the shaft under the jolts and jars of use, the connected ends being brought close together and properly held against such whipping. The invention is capable of embodiment in very simple and compact form at small expense and may be easily assembled and applied in use. It is furthermore adapted to be made and sold as an attachment which can be easily applied, for instance, to connect the propeller or drive shaft with the transmission drive in motor vehicles as they now exist on the market and in use by owners with very slight change in the present construction of the drive mechanism. Other novel features will be apparent from the following description taken in connection with the drawings.

Figure 1 is a longitudinal section through one form of my universal joint;

Fig. 2 is a similar view showing a slightly modified arrangement;

Fig. 3 is an end view showing the arrangement of the fastening means;

Fig. 4 is a longitudinal section through a modification of the joint made in duplicate form; and Fig. 5 is an enlarged detail sectional view of the fabric construction of the disks used in the joint.

In the drawings I have shown my universal joint used to form the connection between the propeller or drive shaft 10 of a motor vehicle and the differential drive 11. In this form the drive shaft 10, which is ordinarily made in the form of a hollow tube, has its end bent outwardly forming a flange 12, and the outer face of this flange is provided with corrugations or slight projections 13 for the purpose of making a gripping connection with the fiber disk to be described, and this flange is provided with holes at intervals to receive the bolts 14. While this flange construction furnishes easy and convenient means for securing my joint to the end of the drive shaft, it will, of course, be understood that my invention is not limited to this particular form, but in its broader aspects includes any means on the end of the shaft to which the joint may be properly secured. As is usual the differential drive spindle 11 is formed with a tapering end 15. and the sleeve or thimble 16 having a conical socket fitting the tapered end of 11 and held in place by the nut 17 engaging the screw threaded central projection on the end of 11. This sleeve 16 has the laterally extending flange 18, the outer surface of which is preferably made corrugated, or with slight projecting portions 19, for the purpose of furnishing a proper gripping surface for engaging the fabric disk of my joint, and there are bolt holes through it at intervals to receive the fastening bolts 20. It will, of course, be understood that some other construction might be used to secure the joint to the differential drive.

My invention itself consists of an attachment which may be interposed between and connected to the shafts 10 and 11 as above indicated, and is composed broadly of two parallel disks 21, 22, spaced apart sufficiently to permit bending motion and slight longitudinal motion, and connected together at the outer periphery by a filler ring 23, which may be secured to the outer margins of the disk by bolt 24, passing through the outer edges of the disks and the ring. These disks 21, 22 are composed of a fabric material which has the necessary strength, resiliency and elasticity, and may be made up of asbestos and rubber preferably made in layer form and cemented and vulcanized, and being in some respects similar to the well known brake band and clutch material now used commercially. The invention, however, is not limited to the use of asbestos, but other fibrous material may be used in place of it. The disks, as above stated are preferably made in layers, as illustrated in Fig. 5, the two outer layers extending from the central opening to the extreme edge, and being folded over on each other as illustrated, and the intermediate layers terminating short of the outer margin at intervals, so as to give a tapering effect from a point near the center to the outer margin where the ring is secured. The disk will, of course, be made under or subjected to the necessary high pressure and heat to give it the necessary coherence and elasticity. The ring 23, as shown in Fig. 1, for connecting the disks at their margins may be formed of aluminum or similar metal, and is cut away at its margins on the outer side, leaving the projecting portions 25 forming outwardly extending shoulders against which the inner edge 26 of the folded over margin of the disk rests, thus serving to help center the disks and hold them in position. Washers 27 having on their faces corrugations or projections, fit over the bolt 24 and against the outer surfaces of the disks, and thus make proper connection with the disk to prevent slipping and to clamp them securely in position on the ring 23. It will be noted that the central portion of the disk 22 between the margins of the flange 12, is of uniform thickness, and is provided with a small central hole 28 which opens into the interior of the shaft 10. A thin metal plate 29 provided on its surface with corrugations or projections, and with a central hole corresponding to the hole 28 fits against the outer face of the disk 22 and the bolts 14 pass through it and through the disk and the flange 12 to securely hold the parts together. As will be seen by reference to Fig. 3, these bolts 14 and the bolts 24 are distributed at intervals throughout the circumference. The disk 22 as above stated, becomes gradually thinner or tapered in section from the flange 12 to the outer ring 23, and the purpose of this is to properly proportion the thickness and strength of the disk in its various parts to the leverage and consequent strain to which it will be subjected at that part by the tendency of the shafts 10 and 11 to turn out of line or move longitudinally. The amount of taper necessary can be determined from the leverage in each case. In forming this taper for the disk, I prefer to have one face of the disk in a straight plane, while making the other face in a form slightly conical, and the conical face should be the one which faces the shaft to which it is attached, so that the facing surfaces of the two disks when they are assembled in the device as shown in Fig. 1, will be parallel. The reason for this is that it permits bringing the disks closer together and tends to aid in preventing the side whipping above mentioned. The disk 21 is substantially the same as 22 above described, except in the form shown in Figs. 1 and 2, the central hole is larger to receive the head of the nut 17 and the thin metal disk 30 provided with corrugations or projections on its face, through which the bolts 20 pass, and is provided with a correspondingly large central hole. This central hole, however, does not provide for ventilation or escape of air since it is closed by the shaft, and consequently the small hole 28 in the disk 22, constitutes the escape opening for the confined air between the disks, and it will act something like a dash pot permitting the air to escape rather gradually after it has been compressed by a relative movement of the disks, and thus it will avoid jars, jolts and any rattling noise and result in smooth running. By the arrangement above described, and as shown in Fig. 1, it will be observed that the ends of the drive shaft and driven shaft are quite close together and connections through the disks are such that there is very little if any possibility of side whipping between the ends of the shafts. It will further be noted that by reason of the connections of the shafts to the disk, every part or portion of the disk is subjected to the turning strains when the drive shaft is operated, and there is no portion of the disk where there is any tendency to buckle, as there would be if there were rigid arms extending outwardly and connected to it at intervals. This results in substantially uniform distribution of the strains in driving, and any relative bending or longitudinal movement of the shafts and prevents localization of strains at one point and the consequent giving out of the device prematurely at such points The structure shown in Fig. 2 is similar to that in Fig. 1, with the exception that the ring connecting the disks 21 and 22 at the margin is not made of metal, but is made of a material or fabric 31, similar to the material of the disks themselves.

In Fig. 4 I have shown the drive shaft 10 and the differential drive 11 with their flanges in the same way as in Fig. 1, but in this instance have made use of two sets of resilient disks instead of one, the outer disk of each set being secured to the outer disk of the other set face to face.

For instance the disk 32 is secured to the differential shaft 11 substantially as in Fig. 1, but the outer end of this disk is bent at an angle from it, so as to taper away from the end of the shaft 11 and has at its outer margin a radial portion 33 which fits against a similar radial portion of the similarly shaped disk 34. The outer margins of the disks 32 and 34 are held together by the bolts 35 and washers 36. In the second set of disks, that marked 37 corresponds to 32 but faces oppositely and is secured to the drive shaft 10 by means similar to that shown in Fig. 1. The disk 38 corresponds to disk 34 and fits close against it throughout the center portion to the point where the disks bend at an angle, and these two disks are held together by bolts 39 and washers 40 having corrugated faces. These disks have at their center a small hole 41 corresponding to the hole 28 for the escape of air and the dampening effect of jolts and jars. This double arrangement of the disks gives greater space between the ends of the connected shafts and permits greater angular movement between those ends, and thus has these functions and advantages over the single form. However, my preferred form is the two parallel disks, as illustrated in Figs. 1 and 2. It will be observed that the universal joint above described may be made and sold as a separate article to be used as an attachment which may with little trouble be substituted for the ordinary friction universal joint now in common use in the drives of motor vehicles.

Having thus described the invention what is claimed as new and desired to be secured by Letters Patent is:

1. In a device of the class described the combination with a drive shaft of a driven shaft normally in line therewith and spaced a short distance therefrom, resilient flexible disks composed of fabric of the character described secured to the ends of said shafts having a substantially free and open space between them permitting free relative movement, the said disks being thinner at the outer margin than at the center tapering in cross section from the center outward to properly distribute the thickness and consequent strength in accordance with the leverage, a spacing ring at the outer margin of said disks, and means securing said disks and spacing ring together around the outer margin.

2. In a device of the class described the combination with a drive shaft of a driven shaft normally in line therewith and spaced a short distance therefrom, resilient flexible disks composed of fabric of the character described secured to the ends of said shafts having a substantially free and open space between them permitting free relative movement, the said disks being thinner at the outer margin than at the center tapering in cross section from the center outward to properly distribute the thickness and consequent strength in accordance with the leverage, the facing surfaces of the two disks being parallel and in radial planes while the outer surfaces are at an angle, a spacing ring at the outer margin of said disks and means securing said disks and spacing ring together around the outer margin.

3. In a universal joint the combination with a drive shaft of a driven shaft in line therewith but separated longitudinally therefrom, a circular disk of flexible resilient material secured at its central portion to the end of one of said shafts and projecting laterally therefrom, the said disk being thinner near its outer margin than at the center tapering gradually in cross section from the point of connection to the shaft to a point near the margin, and means connecting the outer margin of said disk to said outer shaft.

4. In a universal joint the combination with a drive shaft of a driven shaft in line therewith but separated longitudinally therefrom, a circular disk of flexible resilient fabric of the class described secured at its central portion to the end of one of said shafts and projecting laterally therefrom, the said disk being thinner near its outer margin than at the center tapering gradually in cross section from the point of connection to the shaft to a point near the margin, and means connecting the outer margin of said disk to said other shaft.

5. In a universal joint the combination with a drive shaft of a driven shaft in line therewith but separated longitudinally therefrom, a circular disk of flexible resilient material secured at its central portion to the end of each of said shafts and projecting laterally therefrom, the said disk being thinner near its outer margin than at the center tapering gradually in cross section from the point of connection to the shaft to a point near the margin, an interposed ring against opposite sides of which said disks fit at the margin, and fastening means for securing said disks and ring together.

6. An attachment adapted for use as a universal joint connection between alined driving and driven shafts comprising spaced disks of flexible resilient fabric of the type described, one of said disks having a vent hole therein, a spacing ring between and secured to said disks at the margin, thin metal disks having roughened surfaces fitting the facing surfaces of said fabric disks around the central portion, and means making connection with said disks and adapted to be detachably connected to said shafts to hold said disks on said shafts.

7. An attachment adapted for use as a universal joint connection between alined driving and driven shafts comprising spaced disks of flexible resilient fabric of the type described one of said disks having a vent hole therein, a spacing ring between and secured to said disks at the margin, thin metal disks having roughened surfaces fitting the facing surfaces of said fabric disks around the central portion, the said disks being tapering in cross section from approximately the margins of said metal disks to said spacing ring, and bolts passing through said metal disks and fabric disks and adapted to be connected with the ends of said shafts to secure said disks thereto.

8. An attachment adapted for use as a universal joint connection between alined driving and driven shafts comprising spaced disks of flexible resilient fabric of the type described, one of said disks having a vent hole therein, a spacing ring between and secured to said disks at the margin, thin metal disks having roughened surfaces fitting the facing surfaces of said fabric disks around the central portion, the said disks being tapering in cross section from approximately the margins of said metal disks to said spacing ring, the facing surfaces of said fabric disks being in straight planes whereas the outer surfaces are slightly conical, and means for detachably securing said fabric disks and metal disks to the ends of said shafts.

9. In a device of the class described the combination with a hollow propeller shaft provided with an outwardly extending flange at its end having on its surface small corrugations or projections, of a fabric disk of resilient flexible material of the class described fitting against said flange, thin metal holding means having small corrugations or projections fitting said disk opposite the flange of said propeller shaft, bolts passing through said metal means disk and flange to secure them together, a second fabric disk similar to and uniformly spaced from said first disk, a ring joining said disks at the margin, a driven shaft and means for securing said second disk to said driven shaft.

In testimony whereof I affix my signature.

ARTHUR M. LAYCOCK.